(No Model.)
J. GILBERT.
ADJUSTMENT FOR HARVESTER REELS.
No. 357,822. Patented Feb. 15, 1887.
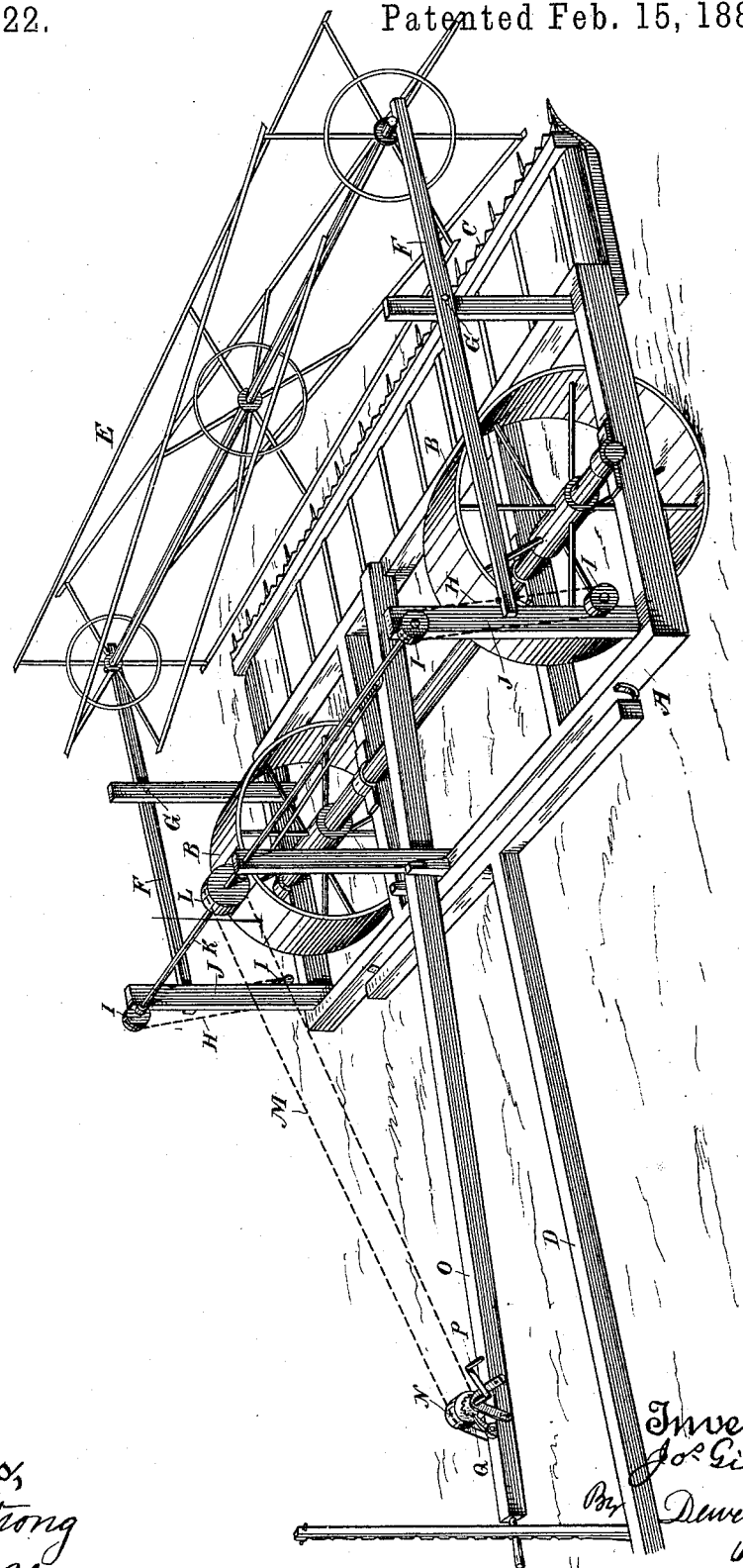
Witnesses,
Geo. H. Strong
Inventor
Jos Gilbert
By Dewey & Co.
atty

United States Patent Office.

JOSEPH GILBERT, OF LOS ANGELES, CALIFORNIA.

ADJUSTMENT FOR HARVESTER-REELS.

SPECIFICATION forming part of Letters Patent No. 357,822, dated February 15, 1887.

Application filed May 12, 1886. Serial No. 202,001. (No model.)

*To all whom it may concern:*

Be it known that I, JOSEPH GILBERT, of Los Angeles, State of California, have invented an Improvement in Adjustments for Harvester-Reels; and I hereby declare the following to be a full, clear, and exact description of the same.

My invention relates to a mechanism for adjusting harvester-reels for use in high or low grain. It consists in the devices hereinafter described and claimed.

Referring to the accompanying drawing, the figure is a perspective view showing the method of attaching the reel and operating the same.

A is a harvester-frame, supported upon bearing-wheels B, in the usual manner, having the sickle-bar at the front and the pole D extending to the rear for the attachment of the team.

E is the reel, having its shaft journaled upon the arms F so that it extends above the sickle and by its revolution sweeps the grain backward to be cut by the sickle and fall upon the carrying-belt. The arms F are journaled at G in standards upon the frame, and their rear ends extend back to a point where they are attached to chains H. These chains pass over pulleys I, arranged vertically, one above the other and at a considerable distance apart, being supported upon standards J, which are fixed to the frame of the machine. The rear ends of the arms F are attached to the chains by any suitable means, either by allowing the chains to pass through the end of the arm with a stop upon each side, so as to prevent the chain from slipping, or it may be otherwise secured, either to the front or rear portion of the machine, as may be found most desirable.

The pair of pulleys I are secured to the ends of a horizontal shaft, K, which extends across the machine, being journaled to the upper ends of the posts J. This shaft has a pulley, L, fixed to it near the center, around which a rope or chain, M, passes. It extends back to another pulley which is journaled to the framework on the rear end of the lever O, by which the machine itself is raised and lowered. This lever O is handled by the driver, who stands upon the beam D, in the usual manner, and the pulley N is provided with a crank, P, by which it may be turned, and a pawl and ratchet, as shown at Q, so that it may be held in any desired position. The rear ends of the arm F are attached to the chains H so that when the reel is in its normal position to work in ordinary grain the rear ends of these arms will be about midway between the upper and lower pulleys I. Whenever short grain is to be cut, the reel is depressed by turning the crank P, thus rotating the pulleys and raising the rear end of the arms which are attached to the chain H. If high grain is encountered, the pulleys are rotated in the opposite direction and the rear ends of the levers depressed, thus raising the reel.

By this construction the reel is within easy reach of the driver, and it may be changed at any time to suit the character of the work to be done. Its movement is much greater than when the ordinary crank-arms are used for raising and lowering it, and the arc of a circle through which the rear end of the levers moves is not great enough to interfere with the movements of the chain around the pulleys.

Having thus described my invention, what I claim as new, and desire to secure by Letters Patent, is—

The reel and reel-supporting arms having their rear ends attached to vertically-moving chains, pulleys about which these chains pass, and a shaft upon which one pair of the pulleys is supported, said shaft carrying another pulley near its center, in combination with a crank-pulley fixed upon the lever by which the sickle-bar is raised and lowered, a chain or rope passing between these two pulleys, and a pawl and ratchet by which the mechanism may be held at any desired point, substantially as described.

In witness whereof I have hereunto set my hand.

JOSEPH GILBERT.

Witnesses:
S. H. NOURSE,
H. C. LEE.